US012230858B2

(12) United States Patent
Batel et al.

(10) Patent No.: US 12,230,858 B2
(45) Date of Patent: Feb. 18, 2025

(54) BALUN

(71) Applicant: Commissariat à l'énergie Atomique et aux Énergies Alternatives, Paris (FR)

(72) Inventors: Lotfi Batel, Grenoble (FR); Christophe Delaveaud, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 749 days.

(21) Appl. No.: 17/485,145

(22) Filed: Sep. 24, 2021

(65) Prior Publication Data

US 2022/0102826 A1 Mar. 31, 2022

(30) Foreign Application Priority Data

Sep. 29, 2020 (FR) ....................................... 2009890

(51) Int. Cl.
*H01P 5/10* (2006.01)
*H01F 27/28* (2006.01)
*H01Q 9/16* (2006.01)

(52) U.S. Cl.
CPC ........... *H01P 5/10* (2013.01); *H01F 27/2804* (2013.01); *H01Q 9/16* (2013.01)

(58) Field of Classification Search
CPC .......... H01P 5/10; H01F 27/2804; H01Q 9/16
See application file for complete search history.

(56) References Cited

U.S. PATENT DOCUMENTS 7,176,776 B1 * 2/2007 Tantwai ................ H01P 1/2135 336/200
2004/0119573 A1 * 6/2004 Lee ......................... H01F 19/04 336/200
2006/0087384 A1 * 4/2006 Ezzendine ............... H03H 7/42 333/26
2007/0033243 A1 * 2/2007 Mallegol ................. H01P 1/213 708/300
2008/0252393 A1 * 10/2008 Kearns ...................... H01P 5/10 333/26
2017/0352962 A1 * 12/2017 Jouanlanne .......... H01Q 9/0421

FOREIGN PATENT DOCUMENTS

EP 2432072 A1 * 3/2012 ................ H01P 5/10
EP 2 432 072 B1 4/2018
FR 2 877 163 A1 4/2006

OTHER PUBLICATIONS

Preliminary Search Report for French Application No. 2009890, dated Jun. 21, 2021.

* cited by examiner

*Primary Examiner* — Malcolm Barnes
(74) *Attorney, Agent, or Firm* — Wolf, Greenfield & Sacks, P.C.

(57) ABSTRACT

A balun including first and second conductive tracks located vertically in line and at a distance from each other and having a same pattern.

11 Claims, 7 Drawing Sheets

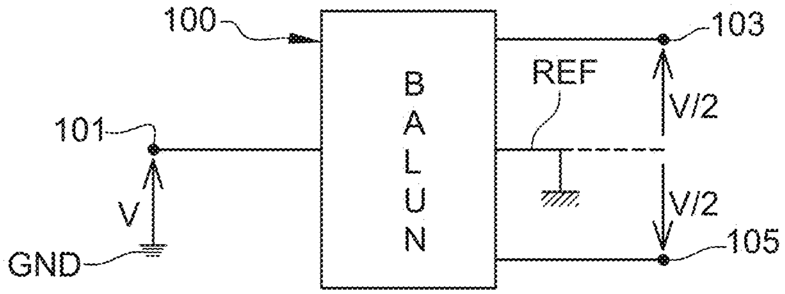
Fig. 1
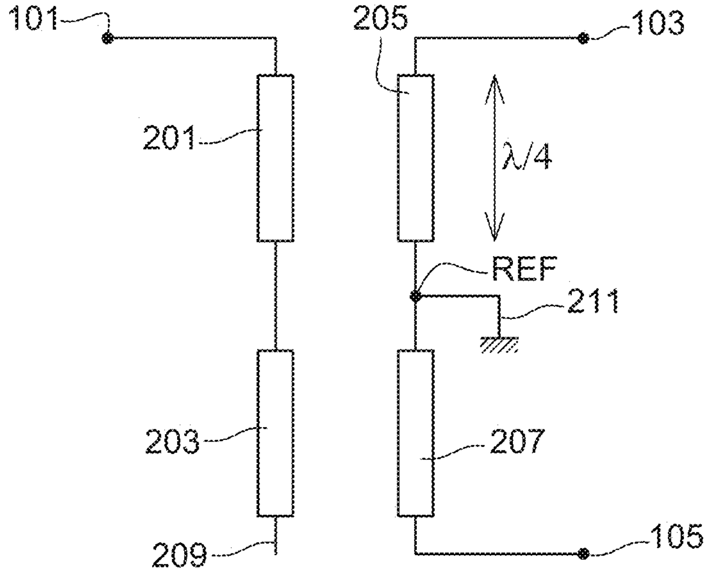
Fig. 2
Fig. 3
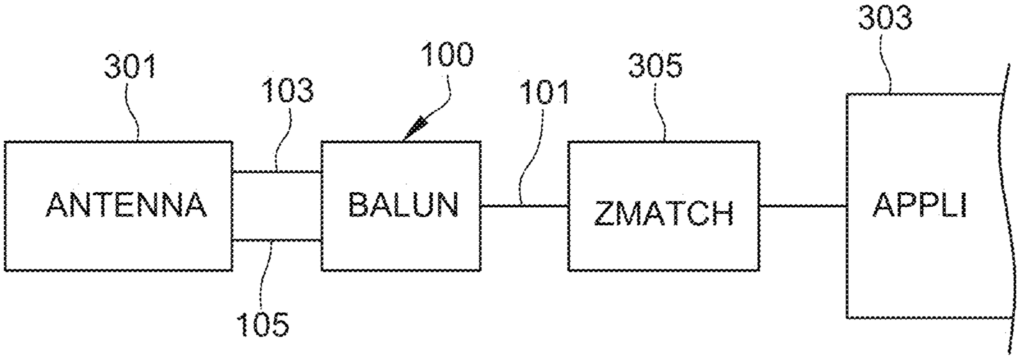

BALUN

The present application claims the priority benefit of French patent application 20/09890 which is herein incorporated by reference.

TECHNICAL BACKGROUND

The present disclosure generally concerns electronic devices. The present disclosure more particularly concerns mode-switching transformers used to convert a voltage from the common mode to the differential mode and conversely. Such transformers are generally called "balun", for "balanced-unbalanced".

PRIOR ART

A mode-switching transformer is often used in radio frequency transmit-receive chains, for example, of cell phones. This type of application currently uses balun-type devices, the antenna side being most often associated with a device at one end only.

Baluns with coupled lines, called distributed, formed of conductive tracks coupled two by two are particularly known, the operating frequency of the transformer being conditioned by the length of the lines. However, the integration of such baluns in small devices adversely affects their performance.

SUMMARY

There is a need to improve current coupled-line baluns.

An embodiment overcomes all or part of the disadvantages of known coupled-line baluns.

An embodiment provides a balun comprising first and second conductive tracks located vertically in line and at a distance from each other and having a same pattern.

According to an embodiment, an end of the first conductive track and an end of the second conductive track are connected by at least one conductive via.

According to an embodiment, the other ends of the first and second conductive tracks are intended to be respectively connected to first and second terminals of an antenna.

According to an embodiment, the first and second conductive tracks and the conductive via define a quarter-wavelength slot.

According to an embodiment, the first and second conductive tracks have a same width.

According to an embodiment, the first and second conductive tracks are meandered.

According to an embodiment, the first and second conductive tracks are respectively formed in first and second metal layers of a printed circuit board, the first and second metal layers being insulated from each other by at least one insulating layer.

According to an embodiment, the transformer further comprises first and second microstrip lines, each comprising a strip respectively located vertically in line with and at a distance from the first and second conductive tracks, the first and second conductive tracks being interposed between the strips.

According to an embodiment, the strips of the first and second microstrip lines are respectively formed in third and fourth metal layers of the printed circuit board, the third and fourth metal layers being respectively insulated from the first and second metal layers by insulating layers.

According to an embodiment, a second conductive via connects an end of the strip of the first microstrip line to an end of the strip of the second microstrip line.

According to an embodiment, the other end of the strip of the first microstrip line is intended to be connected to a conductor of an asymmetrical line.

According to an embodiment, the first microstrip line has a characteristic impedance equal to approximately 50Ω.

An embodiment provides a radio frequency communication system comprising:

a balun such as described; and a symmetrical dipolar antenna, connected to symmetrical ports of the balun.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 1 schematically shows the function of a balun;

FIG. 2 schematically shows an equivalent circuit of a conventional Marchand-type balun;

FIG. 3 schematically shows, in the form of blocks, an example of an assembly using a balun of the type to which the described embodiments apply;

DESCRIPTION OF THE EMBODIMENTS

Figure 4:
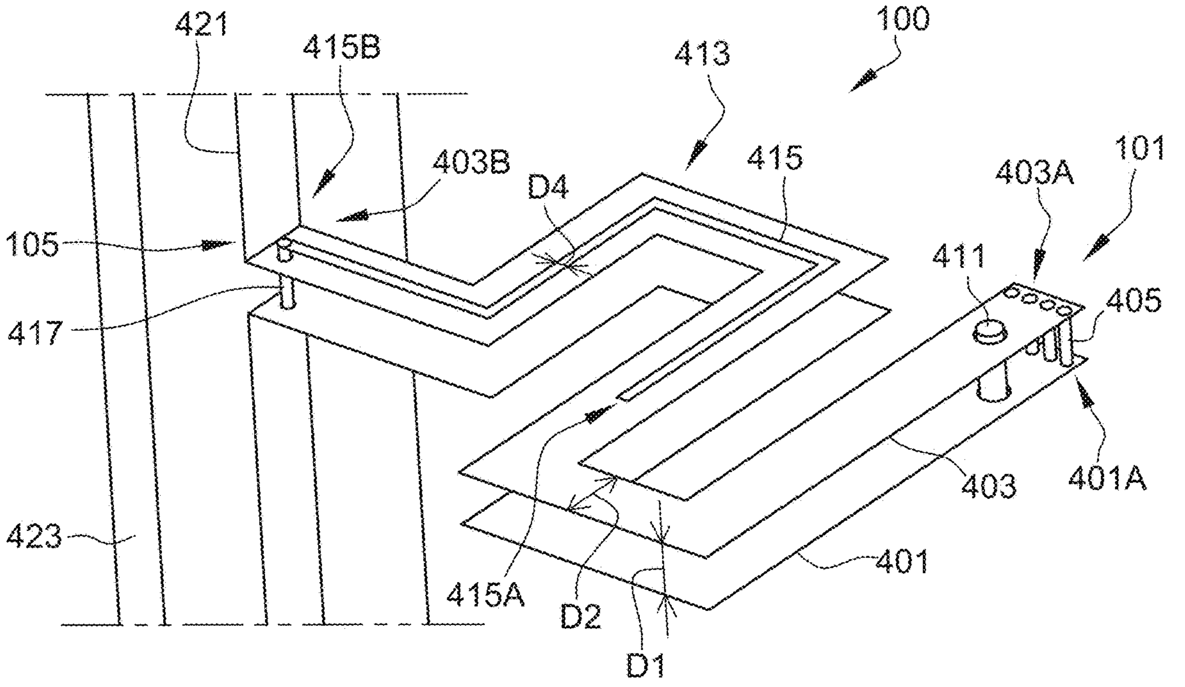
FIG. 4 is a partial simplified perspective view of a balun according to an embodiment.

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the upstream and downstream circuits of a balun have not been detailed, the described embodiments applying whatever the circuits or equipment connected on the differential mode side and on the common mode side. Further, the practical forming of conductive tracks and of microstrip lines on a multilevel substrate has not been detailed, the implementation of the described embodiments using usual conductive track and microstrip line forming techniques.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless specified otherwise, the expressions "around", "approximately", "substantially" and "in the order of" signify within 10%, and preferably within 5%.

FIG. 1 schematically shows the function of a mode-switching transformer 100 (BALUN), also called balun (for "balanced-unbalanced") or symmetrizer circuit in the present description. In the shown example, balun 100 comprises, on the common mode side, a so-called common mode port 101. As an example, common mode port 101 is intended to be connected to a conductor of an asymmetrical line, for example, to a core of a coaxial cable or to a strip of a microstrip line.

In the shown example, balun 100 further comprises, on the common mode side, two ports 103 and 105. Ports 103 and 105 are for example symmetrical with respect to a reference REF, for example, the ground. As an example, ports 103 and 105 are intended to be respectively connected to two terminals of an antenna, for example, a symmetrical dipolar antenna.

On the common mode side, the received or transmitted signal is most often referenced to ground GND. The grounds on the common mode side and on the differential mode side may have potentials different from each other. As a variant, the grounds on the common mode side and on the differential mode side are at a same potential. For a perfectly symmetrical balun 100, a voltage V on the common mode side is converted into two voltages V/2 on the differential mode side.

FIG. 2 schematically shows an equivalent circuit of a conventional Marchand-type balun. A Marchand-type balun is a symmetrical balun comprising coupled lines calculated from a $\lambda/4$ wavelength, where $\lambda$ represents a wavelength corresponding to a central frequency of a passband desired for the balun.

In the shown example, conductive sections 201, 203, 205, and 207 are coupled two by two. More precisely, the two sections 201 and 203 are series-connected between common-mode access port 101 and an access 209 generally left open and left floating. The two other sections 205 and 207 are series-connected between the two differential mode access ports 103 and 105 and have a junction point 211 connected to ground REF, which forms the reference on the differential side. The signals present on differential mode input-output terminals 103 and 105 are for example phase-shifted by 180° with respect to each other.

Conductive section 201 is for example a microstrip line having a characteristic impedance equal to approximately 50Ω. Conductive section 203 is for example a setting element or stub of adjustable length to set an input impedance of an antenna. Conductive sections 205 and 207 for example each have a quarter-wave length ($\lambda/4$).

A balun such as illustrated in FIG. 2 where all the conductive sections 201, 203, 205, and 207 have identical structures and lengths, results in an impedance ratio equal to one between the primary (common mode) and the secondary (differential mode).

FIG. 3 schematically shows, in the form of blocks, an example of an assembly using a balun 100 (BALUN) of the type to which the described embodiments apply.

In the shown example, the two differential access ports 103 and 105 are connected to a radio frequency transmit-receive antenna 301 (ANTENNA). Common-mode access port 101 is coupled to one or a plurality of circuits 303 (APPLI) for using received signals and preparing signals to be transmitted.

In the shown example, an impedance matching circuit 305 (ZMATCH) is interposed between balun 100 and circuit(s) 303.

Figure 5:
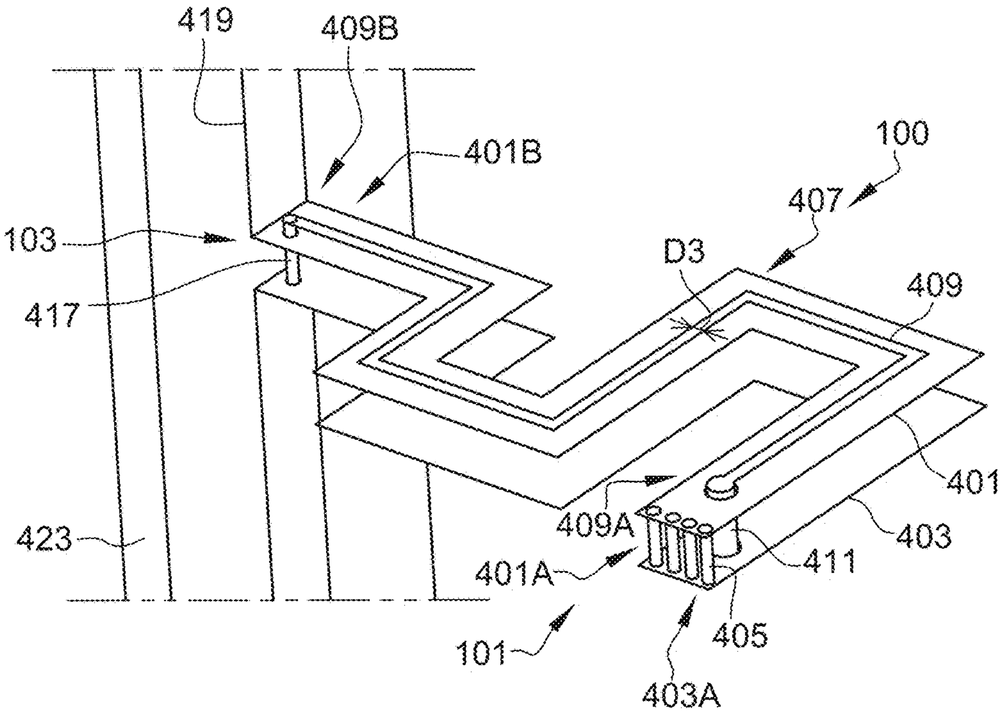
FIG. 5 is another partial simplified perspective view of the balun of FIG. 4.

FIGS. 4 and 5 are partial simplified perspective views of balun or mode-switching transformer 100 according to an embodiment. FIG. 5 more precisely corresponds to a view where balun 100 is rotated by approximately 180° with respect to the orientation of FIG. 4. To ease the understanding, only electrically-conductive portions of balun 100 have been shown in FIGS. 4 and 5.

In the shown example, balun 100 comprises a first conductive track 401 and a second conductive track 403. The second conductive track 403 is located vertically in line with and at a distance from first conductive track 401. In other words, the first and second conductive tracks 401, 403 of balun 100 are stacked and located in front of each other. The first and second conductive tracks 401, 403 are insulated from each other, for example, by an electrically-insulating layer not shown in FIGS. 4 and 5. The first conductive track 401 is separated from the second conductive track 403 by a distance D1. As an example, distance D1 is in the range from 100 μm to 5 mm, for example, equal to approximately 1.28 mm.

In the shown example, second conductive track 403 has a pattern identical to that of first conductive track 401, to within manufacturing dispersions. Further, first conductive track 401 and second conductive track 403 for example have a same width D2, to within manufacturing dispersions. As an example, the width D2 of the first and second conductive tracks 401, 403 is in the range from 100 μm to 10 mm, for example, equal to approximately 3 mm. Distance D2 is for example conditioned by a width of wires of a symmetrical antenna intended to be connected to balun 100.

More generally, the first and second tracks 401, 403 for example have similar shapes, for example, identical shapes to within manufacturing dispersions. First and second tracks 401, 403 are also called twin lines.

In the shown example, the pattern of first and second conductive tracks 401, 403 is meandered. The meanders of first and second conductive tracks 401, 403 particularly enable to decrease the bulk of balun 100. As a variant, the pattern of first and second conductive tracks 401, 403 may be of any shape, for example, rectilinear, serpentine-shaped, spiral-shaped, etc. The pattern of first and second conductive tracks 401, 403 is for example selected to optimize the space available for the forming of balun 100 while avoiding or limiting the forming of a coupling between neighboring portions of a same conductive track 401, 403.

In the shown example, an end 401A of first conductive track 401 is connected to an end 403A of second conductive track 403 by first conductive vias 405. More precisely, in the shown example, first and second conductive tracks 401, 403 are shorted by first conductive vias 405. Although four first conductive vias 405 have been shown in FIGS. 4 and 5, balun 100 may comprise any number, greater than or equal to one, of first conductive vias 405 connecting end 401A of first conductive track 401 to end 403A of second conductive track 403.

First and second conductive tracks 401, 403 for example each have a length substantially equal to one quarter of the wavelength $\lambda$ corresponding to the central frequency of the passband desired for balun 100. First and second conductive tracks 401, 403 and first conductive vias 405 then define together a quarter-wave ($\lambda/4$) slot of balun 100. As an example, for a central frequency in the order of 868 MHz, the length of each of the first and second conductive tracks 401, 403 is in the range from 5 to 10 cm, for example, equal to approximately 8.6 cm in air. This length is for example decreased by a factor equal to approximately $1/\sqrt{\varepsilon_r \mu_r}$ when lines 401, 403 are printed on a substrate of relative dielectric permittivity $\varepsilon_r$ and of relative magnetic permeability $\mu_r$. As an example, the substrate has a relative dielectric permittivity $\varepsilon_r$ equal to approximately 6.15 and a relative magnetic permeability $\mu_r$ equal to approximately 1.

In the shown example, balun 100 further comprises a first microstrip line 407 (FIG. 5). First microstrip line 407 comprises a strip 409 located vertically in line with and at a distance from first conductive track 401. Strip 409 is insulated from first conductive track 401, for example by an electrically-insulating layer, not shown in FIGS. 4 and 5. Strip 409 for example has a pattern identical to that of first conductive track 401. In the shown example, strip 409 is substantially aligned with respect to the median line of first conductive track 401. First conductive track 401 for example forms a ground plane of microstrip line 407. Strip 409 has a width D3 smaller than the width D2 of first conductive track 401. As an example, strip 409 is approximately three times thinner than first conductive track 401. This particularly enables to concentrate field lines between strip 409 and its ground plane, formed by conductive track 401, to obtain a microstrip-type guided propagation mode.

In the shown example, strip 409 has a length slightly smaller than that of first conductive track 401. More precisely, strip 409 stops before the location vertically in line with end 401A of first conductive track 401.

As an example, microstrip line 407 has a characteristic impedance substantially equal to 50Ω.

In the shown example, the common-mode port 101 of balun 100 is defined by a second conductive via 411 connected to an end 409A of the strip 409 of first microstrip line 407. Second conductive via 411 may however be replaced with any contacting element enabling to form port 101, for example, a conductive pad connected to end 409A of strip 409.

Second conductive via 411 is for example insulated from the first and second conductive tracks 401, 403. In the shown example, second conductive via 411 crosses the first and second conductive tracks 401, 403 without contacting them.

In the shown example, balun 100 further comprises a second microstrip line 413 (FIG. 4). Second microstrip line 413 is for example similar to first microstrip line 407, but particularly has a length shorter than that of first microstrip line 407. Second microstrip line 413 defines an setting element or stub ending in open circuit. As a variant, the setting stub is ended by a short-circuit. The length of second microstrip line 413 is for example adjusted to obtain a desired input impedance value of an antenna intended to be connected to balun 100.

Second microstrip line 413 comprises a strip 415 located vertically in line with and at a distance from second conductive track 403. Strip 415 is insulated from first conductive track 401, for example by an electrically-insulating layer, not shown in FIGS. 4 and 5. Strip 415 for example has a pattern identical to that of second conductive track 403. In the shown example, strip 415 is substantially aligned with respect to the median line of second conductive track 403. Second conductive track 403 for example forms a ground plane of microstrip line 413. Strip 415 has a width D4. The width D4 of strip 415 is for example substantially equal to the width D3 of strip 409.

In the shown example, strip 415 has a length shorter than that of strip 409. On the side of end 403A of second conductive track 403, strip 415 for example has an end 415A located vertically in line with second conductive track 403. In the shown example, end 415A of strip 415 is not connected to second conductive track 403. As a variant, end 415A of strip 415 is connected to second conductive track 403, for example, by a conductive via located vertically in line with end 415A.

The strip 415 of second microstrip line 413 forms a setting element for balun 100. As an example, the length of the strip 415 of second microstrip line 413 is selected to reach a target impedance value enabling to obtain, on the differential mode side, two substantially symmetrical signals.

In the example illustrated in FIGS. 4 and 5, the other end 409B of strip 409, opposite to end 409A, and the other end 415B of strip 415, opposite to end 415A, are connected together by a third conductive via 417. Third conductive via 417 is insulated from the first and second conductive tracks 401, 403. In the shown example, third conductive via 417 crosses the first and second conductive tracks 401, 403 without contacting them.

Conductive via 417 for example forms a via for exciting the quarter-wave slot of balun 100.

In the shown example, the other end 401B of first conductive track 401, opposite to end 401A, forms the symmetrical port 103 of balun 100. Similarly, the other end 403B of second conductive track 403, opposite to end 403A, forms the symmetrical port 105 of balun 100.

In the shown example, the symmetrical ports 103 and 105 of balun 100 are respectively connected to third and fourth conductive tracks 419, 421 formed at the surface of a support 423. As an example, the third and fourth conductive tracks 419 and 421 are intended to connect the symmetrical ports 103 and 105 of balun 100 to terminals of an antenna, not shown in FIGS. 4 and 5.

An advantage of the embodiment of balun 100 discussed hereabove in relation with FIGS. 4 and 5 lies in the fact that the first and second conductive tracks 401, 403 of its quarter-wave slot are stacked and meandered. This enables balun 100 to be more compact, particularly with respect to a case where the conductive tracks of the quarter-wave slot would be coplanar and/or rectilinear. In particular, the fact for the first and second conductive tracks 401, 403 to be formed in the volume, and not in a same plane, enables to decrease the lateral dimensions of balun 100 while keeping a performance similar to that of a balun which would for example comprise a planar structure. The use of a substrate having a high relative dielectric permittivity $\varepsilon_r$ also contributes to the decrease in the dimensions of balun 100. The integration of balun 100 into radio frequency communication devices of small dimensions, for example, connected objects such as connected watches, connected bracelets, connected key-holders, etc. is thus facilitated.

Figure 6:
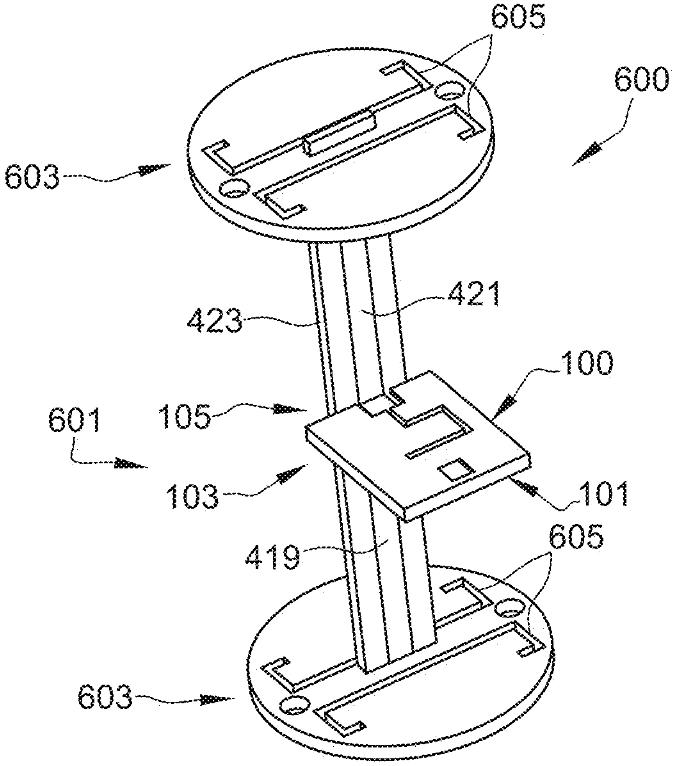
FIG. 6 is a perspective view illustrating an example of integration of the balun of FIG. 4 in a radio frequency communication system.

FIG. 6 is a perspective view illustrating an example of integration of the balun 100 of FIG. 4 in a radio frequency communication system 600.

In the shown example, radio frequency communication system 600 comprises, in addition to balun 100, an antenna 601. Antenna 601 is for example a symmetrical dipolar antenna, for example, a compact differential wire-plate antenna comprising two capacitive roofs 603 located on either side of balun 100. Each capacitive roof 603 comprises slot patterns 605, for example intended to emit an electromagnetic field when they are excited by balun 100. The symmetrical ports 103 and 105 of balun 100 are for example each connected to one of the capacitive roofs 603 of antenna 601 by one of conductive tracks 419, 421.

Balun 100 has an operation similar to that of the March-and-type balun such as previously disclosed in relation with FIG. 2. A signal is for example applied to common mode port 101. This enables to excite, via first via 417 (FIG. 5), the quarter-wave slot of balun 100. The quarter-wave slot of balun 100 then in turn excites dipolar antenna 601, for example symmetrically with currents of equal amplitudes and in phase opposition on each capacitive roof 603 of dipolar antenna 601. The currents are for example of equal amplitude and in phase opposition on either side of the quarter-wave slot. This enables the currents to set back in phase with an equal amplitude along the symmetrical wires of the antenna, for example, in the case of a differential power supply.

Figure 7A:
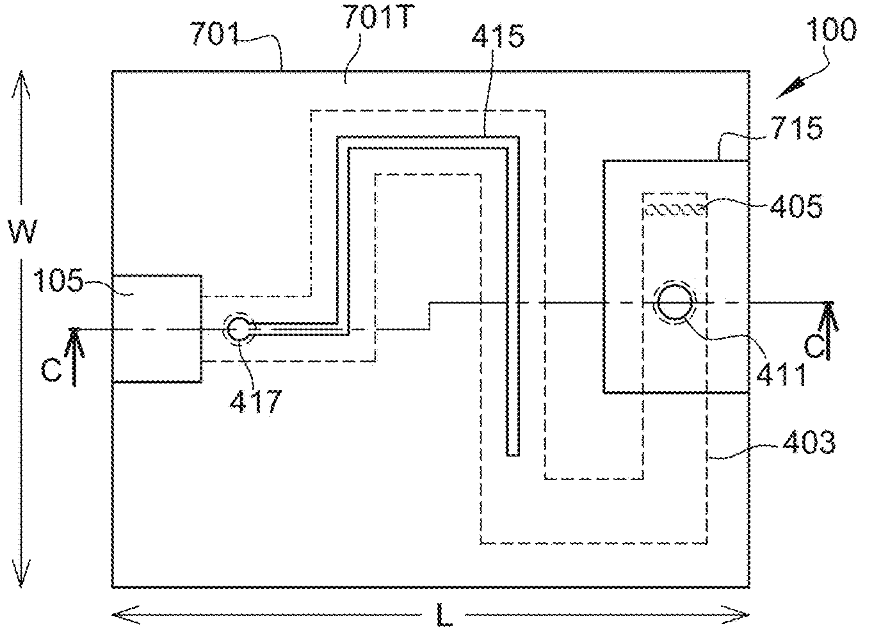
FIG. 7A is a top view of the embodiment of the balun of FIG. 4.
Figure 7B:
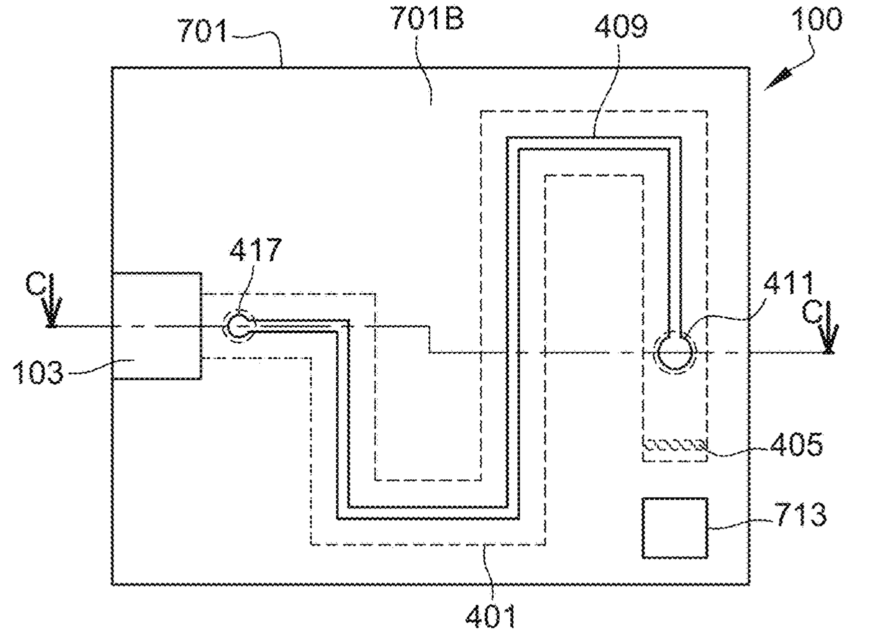
FIG. 7B is a bottom view of the embodiment of the balun of FIG. 4.
Figure 7C:
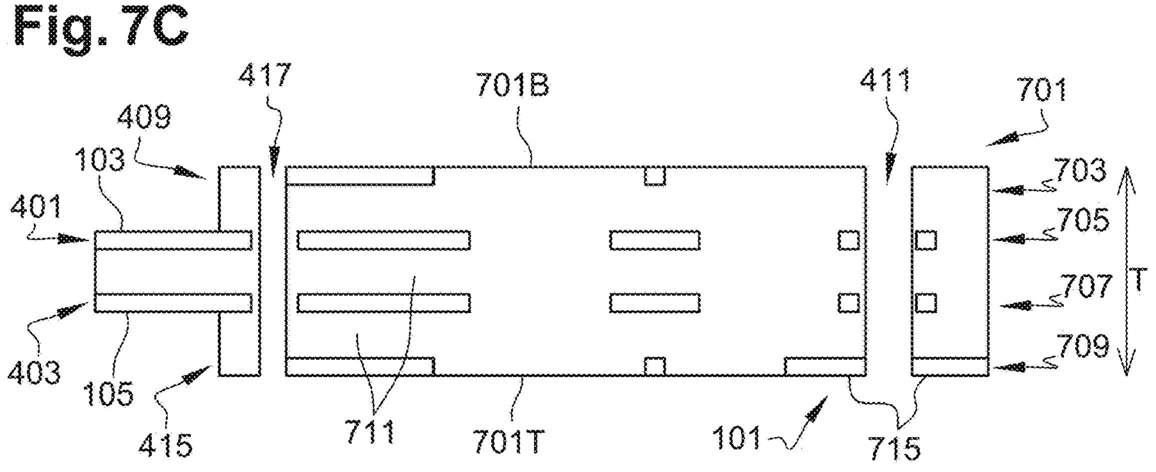
FIG. 7C is a cross-section view of the embodiment of the balun of FIG. 4 along the plane CC of FIGS. 7A and 7B.

FIGS. 7A, 7B, and 7C respectively correspond to top, bottom, and cross-section view of the embodiment of the balun 100 of FIGS. 4 and 5. FIG. 7C is more precisely a cross-section view along plane CC of FIGS. 7A and 7B.

As illustrated in FIGS. 7A to 7C, balun 100 is for example formed in a printed circuit board 701, for example, a multilayer board. In the shown example, printed circuit board 701 comprises four metal layers for example each corresponding to a metallization level. These layers are vertically stacked and separated from one another by insulating layers. More precisely, printed circuit board 701 comprises, starting from a lower surface 701B to a upper surface 701T, first, second, third, and fourth electrically-conductive layers 703, 705, 707, and 709. As an example, the first, second, third, and fourth electrically-conductive layers 703, 705, 707, and 709 are made of a metal, for example, copper, or of a metal alloy.

In the shown example, the first, second, third, and fourth electrically-conductive layers 703, 705, 707, and 709 are regularly spaced apart. As a variant, certain neighboring layers among the first, second, third, and fourth electrically-conductive layers 703, 705, 707, and 709 may be separated by a distance shorter than the distance separating other neighboring layers.

In printed circuit board 701, the first, second, third, and fourth electrically-conductive layers 703, 705, 707, and 709 are insulated from one another by three-electrically insulating layers 711. Insulating layers 711 may have a monolayer or multilayer structure. As an example, electrically-insulating layers 711 are made of a dielectric material, for example, of resin.

Generally, electrically-insulating layers 711 are for example made of a material having a high relative dielectric permittivity Cr. This particularly enables to decrease the distance D1 separating the first and second conductive tracks 401, 403, and thus to obtain a more compact balun, while keeping a sufficient electrical insulation between these tracks to avoid any breakdown phenomenon. As an example, the relative dielectric permittivity $\varepsilon_r$ of the material of insulating layers 711 is in the range from 2 to 30, for example, equal to 6.15.

In the shown example, strip 409, first conductive track 401, second conductive track 403, and strip 415 are respectively formed in the first, second, third, and fourth conductive layers 703, 704, 707, and 709 of printed circuit board 701.

In the shown example, second and third conductive vias 411 and 417 extend vertically, from lower surface 701B, across the thickness of printed circuit board 701 and emerge on the side of upper surface 701T. In the shown example, the second and third conductive vias 411, 417 each cross the first and second conductive tracks 401, 403 through openings formed in each of these tracks. These openings are for example aligned with respect to the axis of vias 411 and 417, but have a diameter greater than that of vias 411 and 417. This particularly enables to avoid any electric contact between first and second tracks 401, 403 on the one hand and second and third vias 411, 417 on the other hand.

In the shown example, the symmetrical access ports 103 and 105 of balun 100 are respectively formed in second and third conductive layers 705, 707. Printed circuit board 701 is for example etched on the side of its upper surface 701T to expose a portion of third conductive layer 707 at the location of symmetrical access port 105. Similarly, printed circuit board 701 is for example etched on the side of its lower surface 701B to expose a portion of second conductive layer 705 at the location of symmetrical access port 103. As a variant, symmetrical access ports 103 and 105 may for example be respectively formed at the lower surface 701B and at the upper surface 701T of printed circuit board 701, for example, by providing contacting elements connected to the first and second conductive tracks 401, 403 by conductive vias.

Balun 100 may further comprise, as in the example illustrated in FIGS. 7A to 7B, metal regions 713 and 715. In the shown example, metal regions 713 and 715 are respectively located on the sides of the lower 701B and upper 701T surfaces of printed circuit board 701. Metal regions 713 and 715 are for example respectively formed in first and fourth conductive layers 703, 709. Metal region 715 is for example connected to second conductive via 411.

Metal regions 713 and 715 are for example intended to ease the connection of the asymmetrical line to balun 100. More precisely, metal region 715 is for example intended to be connected to a conductor of the asymmetrical line, for example, a core of a coaxial cable. Metal region 715 particularly enables to ease the connection of the asymmetrical line to the port 105 of balun 100. Metal region 713 is for example intended to be connected to the other conductor of the asymmetrical line, for example, a ground braid of the coaxial cable.

In the shown example, first conductive vias 405 extend vertically from second layer 705 to third layer 707. As a variant, first conductive vias 405 extend vertically from lower surface 701B, across the thickness of printed circuit board 701, and emerge on the side of upper surface 701T.

As an example, balun 100 has a length L (FIG. 7A) in the range from 15 to 25 mm, for example, equal to approximately 17 mm, a width W (FIG. 7A) in the range from 10 to 20 mm, for example, equal to approximately 12 mm, and a thickness T (FIG. 7C) in the range from 0.5 to 3 mm, for example, equal to approximately 2 mm.

Figure 8:
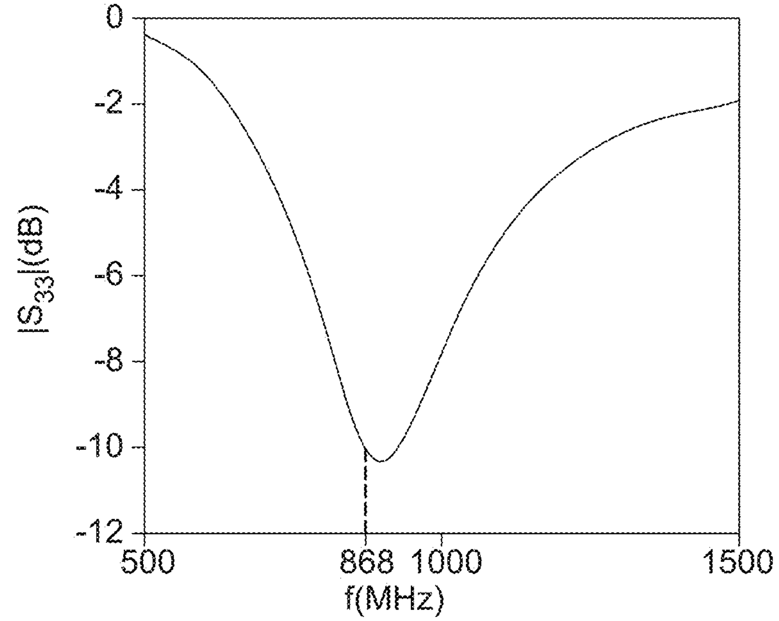
FIG. 8 is a graph of the variation of the modulus of parameter $S_{33}$ of the balun of FIG. 4.
Figure 9:
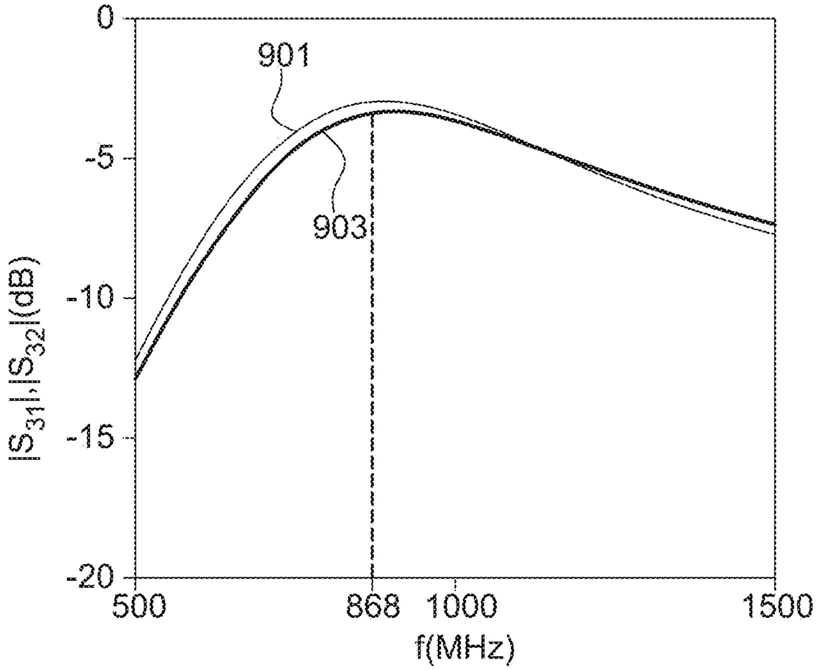
FIG. 9 is a graph of the variation of the modulus of parameters $S_{31}$ and $S_{32}$ of the balun of FIG. 4.
Figure 10:
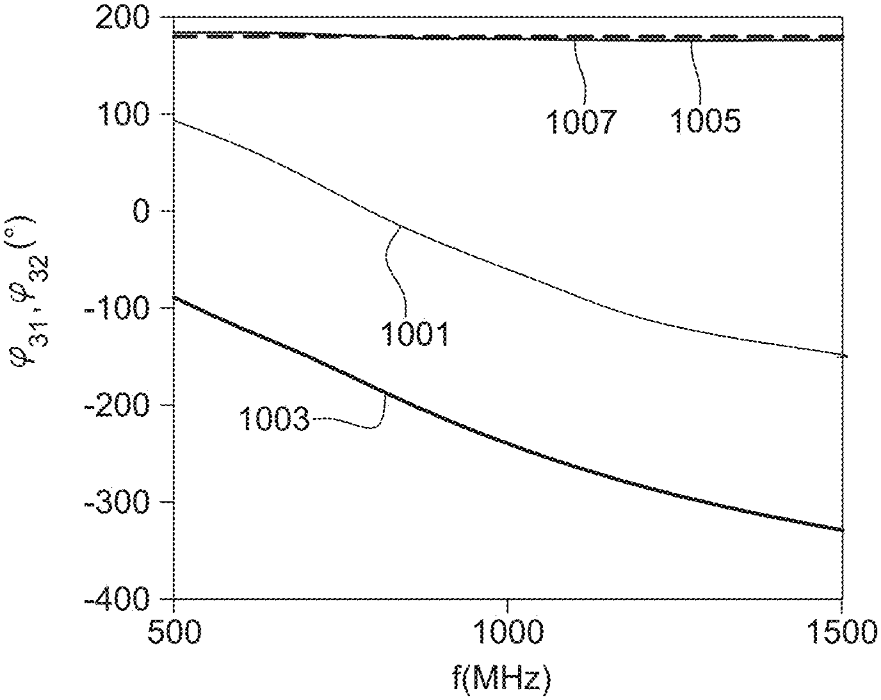
FIG. 10 is a graph of the variation of the phase of parameters $S_{31}$ and $S_{32}$ of the balun of FIG. 4.

FIGS. 8 to 10 hereafter illustrate, in graphs, characteristic parameters of balun 100. These graphs are for example obtained by connecting the core of a cable coaxial to common mode port 101 (second conductive via 411), here used as an input port, by connecting the respective cores of two other cables coaxial to differential mode ports 103 (second conductive layer 705) and 105 (third conductive layer 707), here used as output ports, and by measuring signals transmitted between port 101 and ports 103 and 105.

FIG. 8 is a graph of the variation, according to frequency f in megahertz (MHz), of the modulus of parameter $S_{33}$ ($|S_{33}|$) in decibels (dB) of the balun 100 of FIG. 4. This parameter characterizes a reflected signal level on input port 101.

The graph of FIG. 8 shows that the modulus of parameter $S_{33}$ is smaller than −6 dB over a frequency band in the range from 775 MHz to 1.06 GHz. The modulus of parameter is further smaller than −10 dB for a frequency f in the order of 868 MHz. This for example corresponds to an operation of balun 100 at the usual frequency, in Europe, of RFID ("radio-frequency identification") applications.

FIG. 9 is a graph of the variation, according to frequency f in megahertz (MHz), of the modulus of parameters $S_{31}$ ($|S_{31}|$) and $S_{32}$ ($|S_{32}|$) in decibels (dB) of the balun 100 of FIG. 4. The variations of the modulus of parameters $S_{31}$ and $S_{32}$ are respectively illustrated by curves 901 and 903. Curve 901 for example shows a power level transmitted between input port 101 and output port 103, while curve 903 shows a power level transmitted between input port 101 and output port 105.

Curves 901 and 903 nearly coincide over a frequency range between 500 MHz and 1.5 GHz. In particular, for a frequency f in the order of 868 MHz, the modulus of parameter $S_{31}$ is equal to approximately −3 dB while the modulus of parameter $S_{32}$ is equal to approximately −3.38 dB. The power injected at the input through port 101 is thus substantially divided by two at each output port 103, 105 of balun 100. In other words, the input power is equitably distributed between ports 103 and 105. According to the curves 901 and 903 of the graph of FIG. 9, balun 100 has maximum insertion losses equal to approximately 0.38 dB.

FIG. 10 is a graph of the variation, according to frequency fin megahertz (MHz), of the phase of parameters $S_{31}$ ($\varphi_{31}$) and $S_{32}$ ($\varphi_{32}$) in degrees (°) of the balun 100 of FIG. 4. The variations of the phase of parameters $S_{31}$ and $S_{32}$ are respectively illustrated by curves 1001 and 1003. To ease the reading of the graph of FIG. 10, another curve 1005 corresponding to the difference between curve 1001 and curve 1003 has been shown. Curve 1005 thus illustrates a phase shift between the signals present on the output ports 103 and 105 of balun 100.

Over a frequency range between 500 MHz and 1.5 GHz, curve 1005 substantially coincides with a horizontal dotted line 1007 corresponding to a phase shift equal to 180°. The phase shift between the signals present on each output port 103, 105 of balun 100 is thus substantially equal to 180°.

According to the graphs of FIGS. 9 and 10, it can be observed that balun 100 enables to deliver, on each output port 103, 105, substantially equal power signals phase-shifted by approximately 180°. This means that the embodiment of balun 100 such as previously discussed has the expected symmetrizer function.

Figure 11:
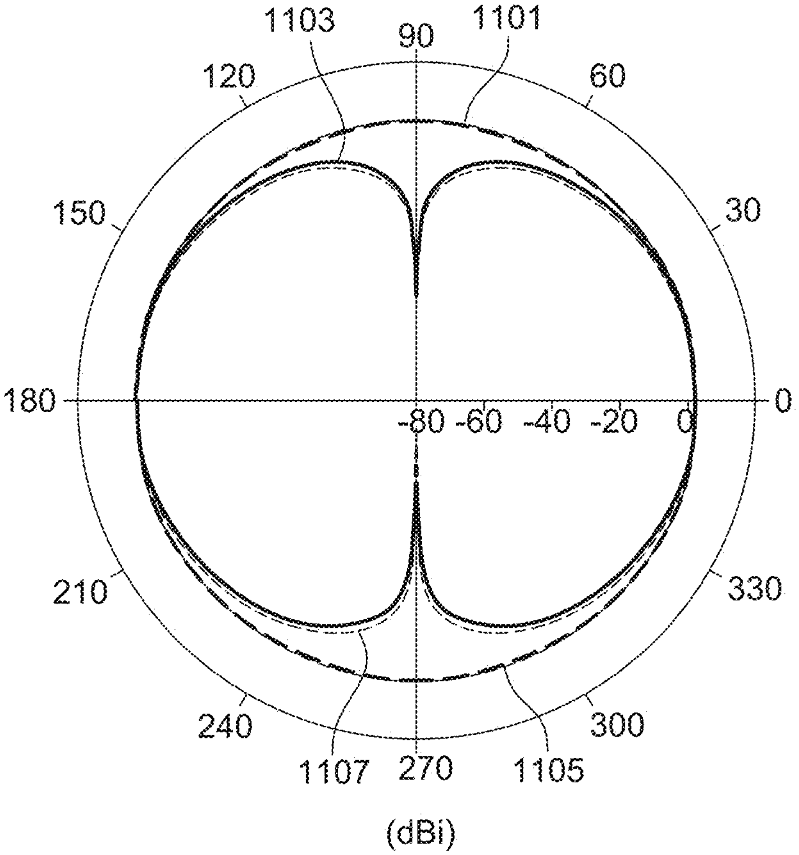
FIG. 11 is a radiation diagram of an antenna of the radio frequency communication system of FIG. 6.
Figure 12:
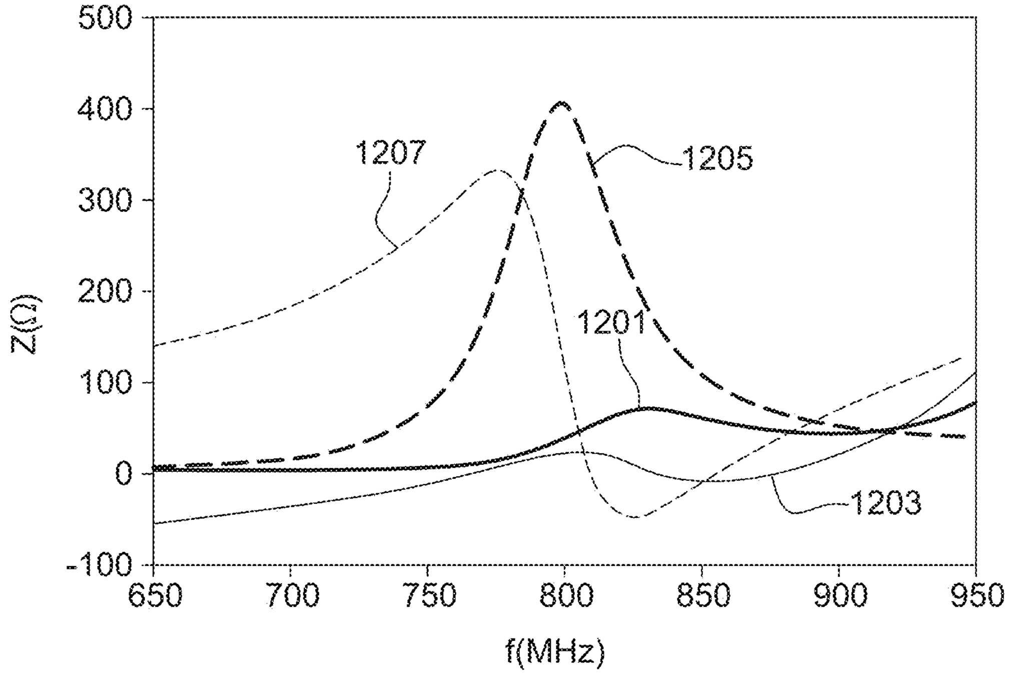
FIG. 12 is a graph of the variation of the impedance of the antenna of the radio frequency communication system of FIG. 6.
Figure 13:
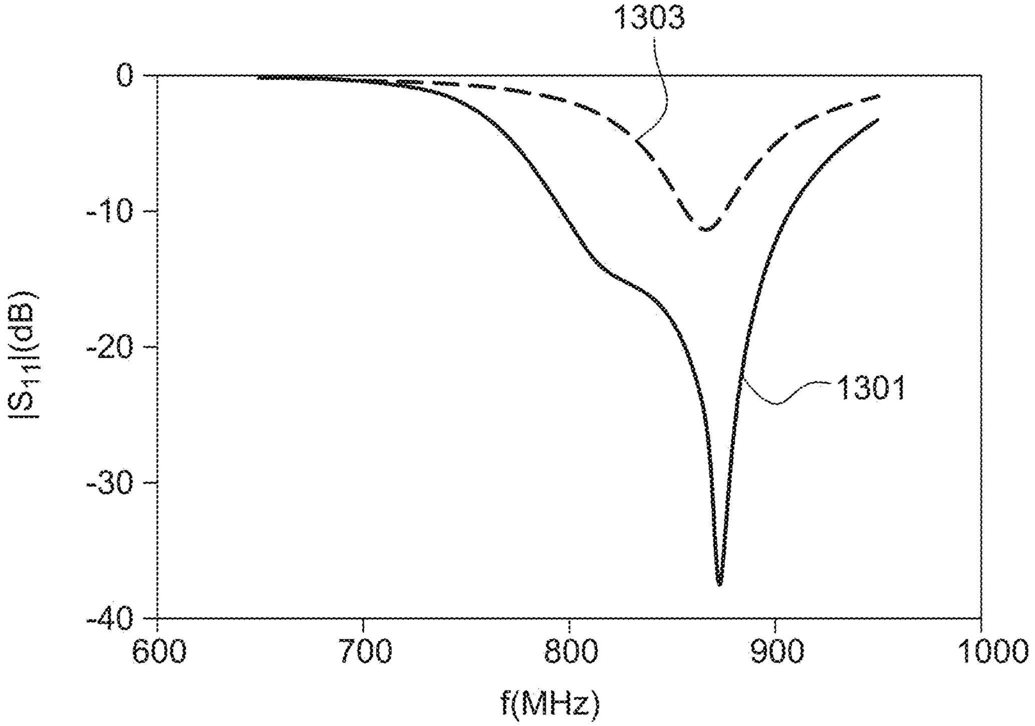
FIG. 13 is a graph of the variation of parameter $S_{11}$ of the antenna of the radio frequency communication system of FIG. 6.

FIGS. 11 to 13 hereafter illustrate, in a diagram and graphs, characteristic parameters of an antenna associated with balun 100. This diagram and these graphs are for example obtained by connecting the core of a coaxial cable to common mode port 101, by respectively connecting differential mode ports 103 and 105 to terminals of an antenna, and by particularly measuring radiation and impedance properties of this antenna.

As an example, balun 100 is in this case connected to the antenna 601 of the radio frequency communication system 600 previously discussed in relation with FIG. 6.

FIG. 11 is a radiation diagram, in isotropic decibels (dBi), of the antenna 601 of the radio frequency communication system 600 of FIG. 6 for a frequency f substantially equal to 868 MHz.

FIG. 11 more precisely illustrates, with curves 1101 and 1103 in full lines respectively corresponding to transverse and front cross-sections, the radiation of antenna 601 measured by exciting this antenna via balun 100. Further, FIG. 11 illustrates, with curves 1105 and 1107 in dotted lines respectively corresponding to transverse and front cross-sections, the radiation of antenna 601 theoretically obtained by directly exciting this antenna with ideal differential ports.

In the diagram of FIG. 11, curve 1101 substantially coincides with curve 1105 while curve 1103 substantially coincides with curve 1107. This indicates that when balun 100 is used to excite antenna 601, radiation properties comparable to those which would be obtained with an ideal differential excitation, that is, a perfectly symmetrical excitation, of antenna 601, are obtained. The diagram of FIG. 11 thus enables to confirm the symmetrical behavior of balun 100.

FIG. 12 is a graph of the variation of impedance Z, in ohms (Ω), of the antenna 601 of the radio frequency communication system 600 of FIG. 6 for a frequency band between 650 and 950 MHz.

FIG. 12 more precisely illustrates, with curves respectively 1201 and 1203 in full lines, the variation of the real part and of the imaginary part of the impedance of antenna 601 powered by using balun 100. Further, FIG. 12 illustrates, with curves respectively 1205 and 1207 in dotted lines, the variation of the real part and of the imaginary part of the impedance of antenna 601 in a case where balun 100 is omitted, for example, in the case of an ideal differential excitation at the base of antenna 601.

FIG. 13 is a graph of the variation, according to frequency fin megahertz (MHz), of the modulus of parameter $S_{11}$ ($|S_{11}|$) in decibels (dB) of the antenna 601 of the radio frequency communication system 600 of FIG. 6. This parameter characterizes a reflected signal level at the input port of antenna 601.

FIG. 12 more precisely illustrates, by a curve 1301 in full line, the variation of parameter $S_{11}$ when antenna 601 is powered by balun 100 and, by a curve 1303 in dotted line, the variation of parameter $S_{11}$ in a case where balun 100 is omitted. It can be observed, according to the curves 1301 and 1303 of the graph of FIG. 13, that balun 100 enables to obtain a bandwidth at −10 dB which is six times wider than that which is obtained without using balun 100. Balun 100 thus enables to perform an impedance matching, as a complement to a symmetrizing of the signal. The impedance matching performed by balun 100 may in particular be adjusted by modifying the length of the strip 415 of second microstrip line 413.

Various embodiments and variants have been described. Those skilled in the art will understand that certain features of these various embodiments and variants may be combined, and other variants will occur to those skilled in the art. In particular, although an embodiment of balun 100 where the quarter-wave slot and the microstrip lines are formed in a printed circuit board with four metallization levels has been described, those skilled in the art are capable of adapting this embodiment to printed circuit boards comprising more than four levels. More generally, those skilled in the art are capable of adapting all that has been described to any type of multilevel substrate.

Further, those skilled in the art are capable of adapting the material and the thickness of each of the conductive 703, 705, 707, and 709 and insulating 711 layers of printed circuit board 701 according to the application. In particular, at least one of layers 703, 705, 707, and 709 may be made of a material different from that of the other layers. Similarly, at least one of layers 711 may be made of a material different from that of the other layers 711. Those skilled in the art are further capable of using one or a plurality of materials of high relative dielectric permittivity εr and/or relative magnetic permeability μr for the forming of all or part of insulating layers 711, for example to still further decrease the bulk of balun 100.

Further, those skilled in the art are capable of adapting the described embodiments to impedance ratios different from one. As an example, this adaptation may be performed by modifying the position of excitation by coupling of the quarter-wave slot, for example, by displacing the third conductive via 417 along the slot defined by the first and second conductive tracks 401 and 403.

Finally, the practical implementation of the described embodiments and variants is within the abilities of those skilled in the art based on the functional indications given hereabove. In particular, the sizing and the practical implementation of a mode-switching transformer such as the previously-described balun 100 is within the abilities of those skilled in the art based on the above indications.

The invention claimed is:

1. Balun comprising first and second stacked conductive tracks, located at a distance and opposite to each other, and having a same pattern;

further comprising first and second microstrip lines each comprising a strip respectively located vertically in line with and at a distance from the first and second conductive tracks, the first and second conductive tracks being interposed between the strips; and wherein a second conductive via connects an end of the strip of the first microstrip line to an end of the strip of the second microstrip line.

2. Balun according to claim 1, wherein an end of the first conductive track and an end of the second conductive track are connected by at least one conductive via.

3. Balun according to claim 2, wherein the other ends of the first and second conductive tracks are intended to be respectively connected to first and second terminals of an antenna.

4. Balun according to claim 2, wherein the first and second conductive tracks and the conductive via define a quarter-wave slot.

5. Balun according to claim 1, wherein the first and second conductive tracks have a same width.

6. Balun according to claim 1, wherein the first and second conductive tracks are meandered.

7. Balun according to claim 1, wherein the first and second conductive tracks are respectively formed in first and second metal layers of a printed circuit board, the first and second metal layers being insulated from each other by at least one insulating layer.

8. Balun according to claim 7, wherein strips of the first and second microstrip lines are respectively formed in third and fourth metal layers of the printed circuit board, the third and fourth metal layers being respectively insulated from the first and second metal layers by insulating layers.

9. Balun according to claim 1, wherein the other end of the strip of the first microstrip line is intended to be connected to a conductor of an asymmetrical line.

10. Balun according to claim 1, wherein the first microstrip line has a characteristic impedance equal to approximately 50Ω.

11. Radio frequency communication system comprising:

a balun according to claim 1; and a symmetrical dipolar antenna, connected to symmetrical ports of the balun.

* * * * *